Feb. 12, 1963
R. H. WISE
3,077,275
LOAD-CARRYING ASSEMBLY
Original Filed June 27, 1956
4 Sheets-Sheet 1
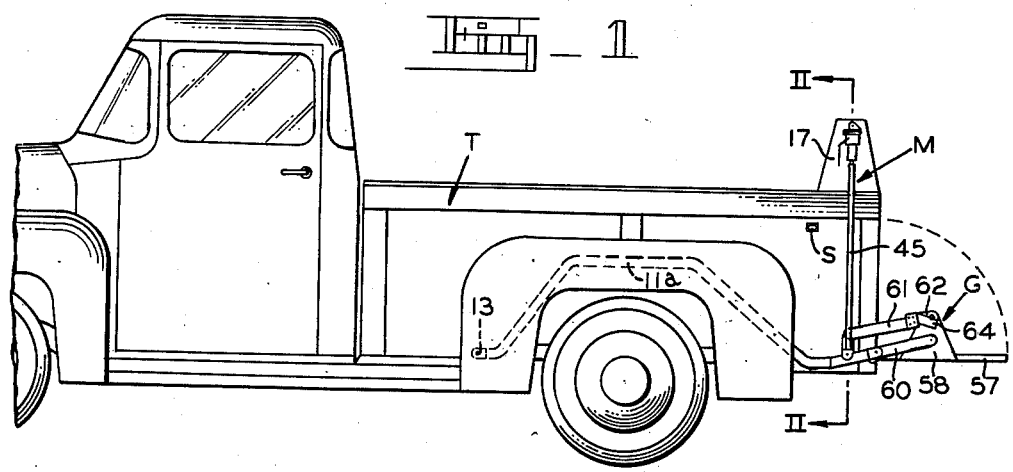
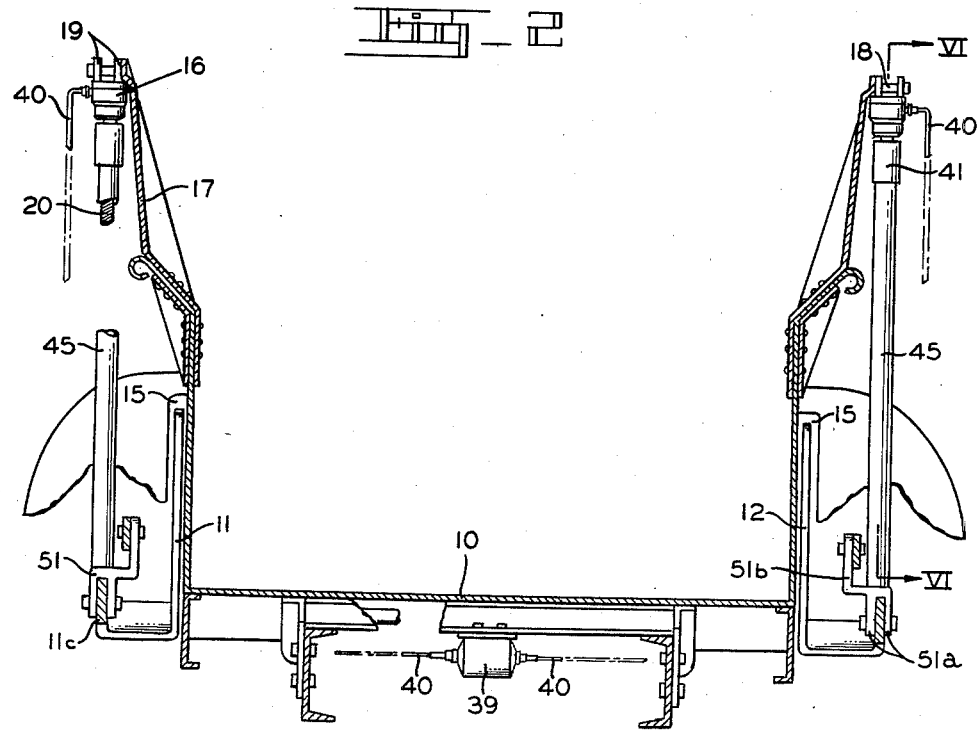
INVENTOR.
RALPH H. WISE
BY

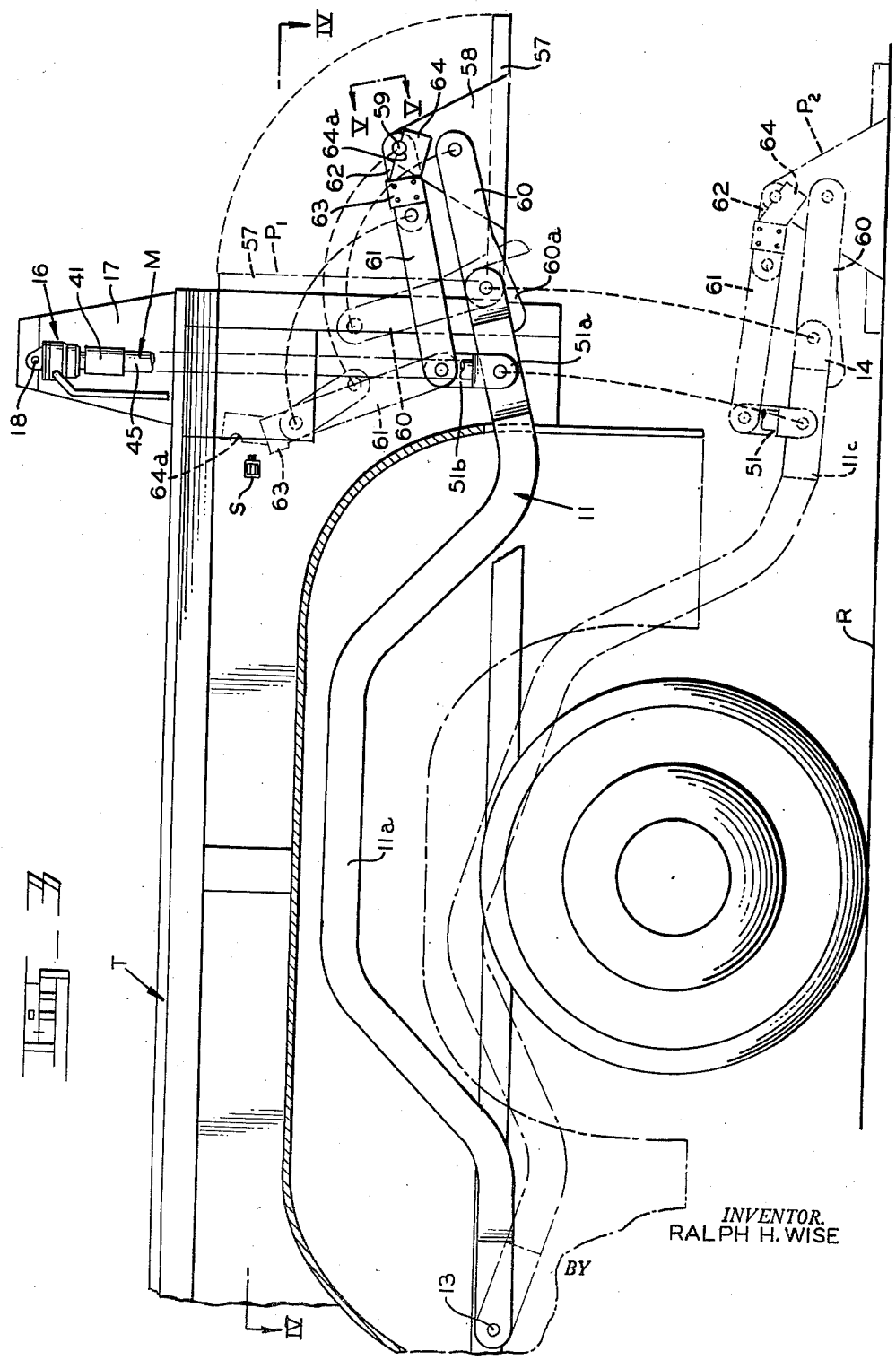

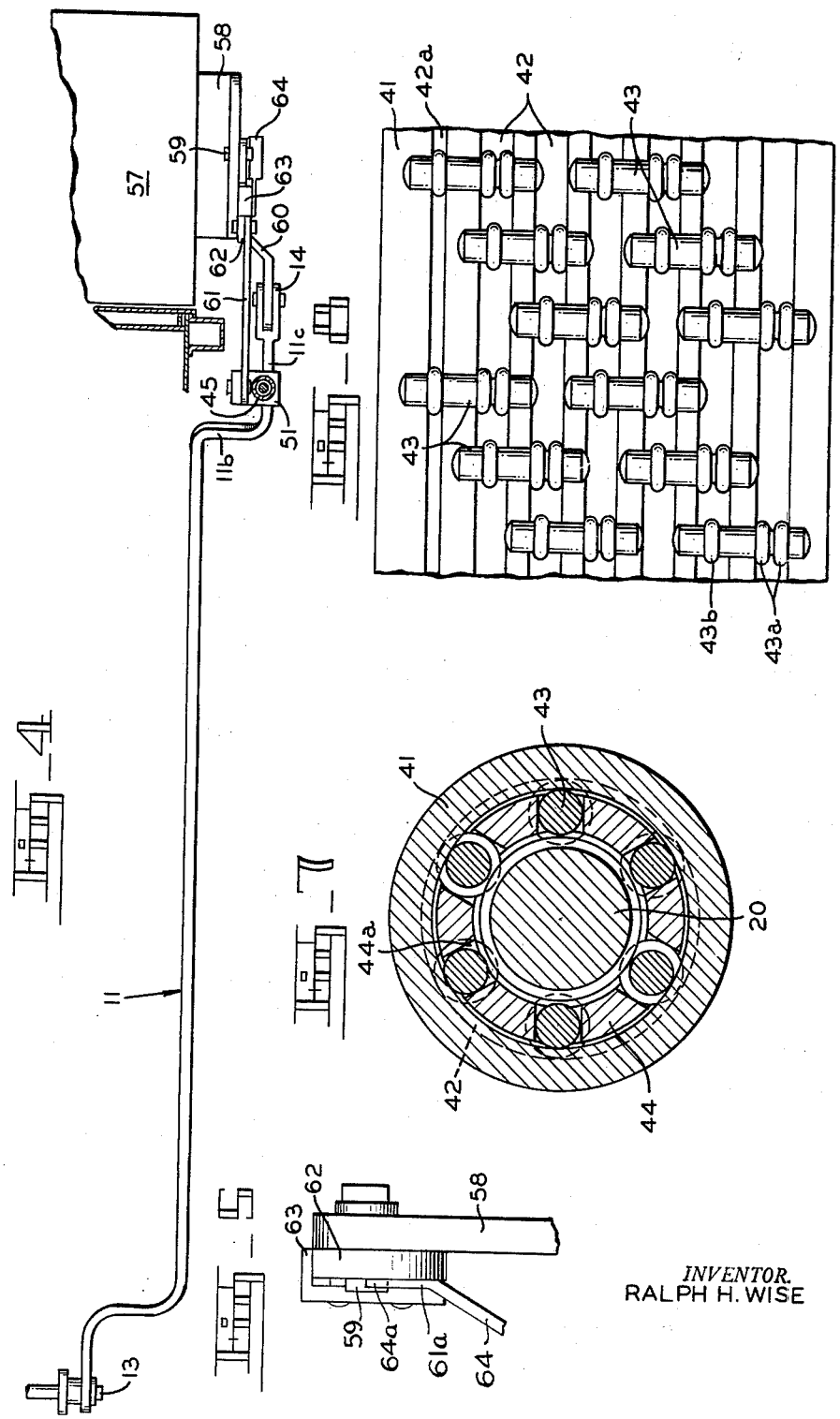

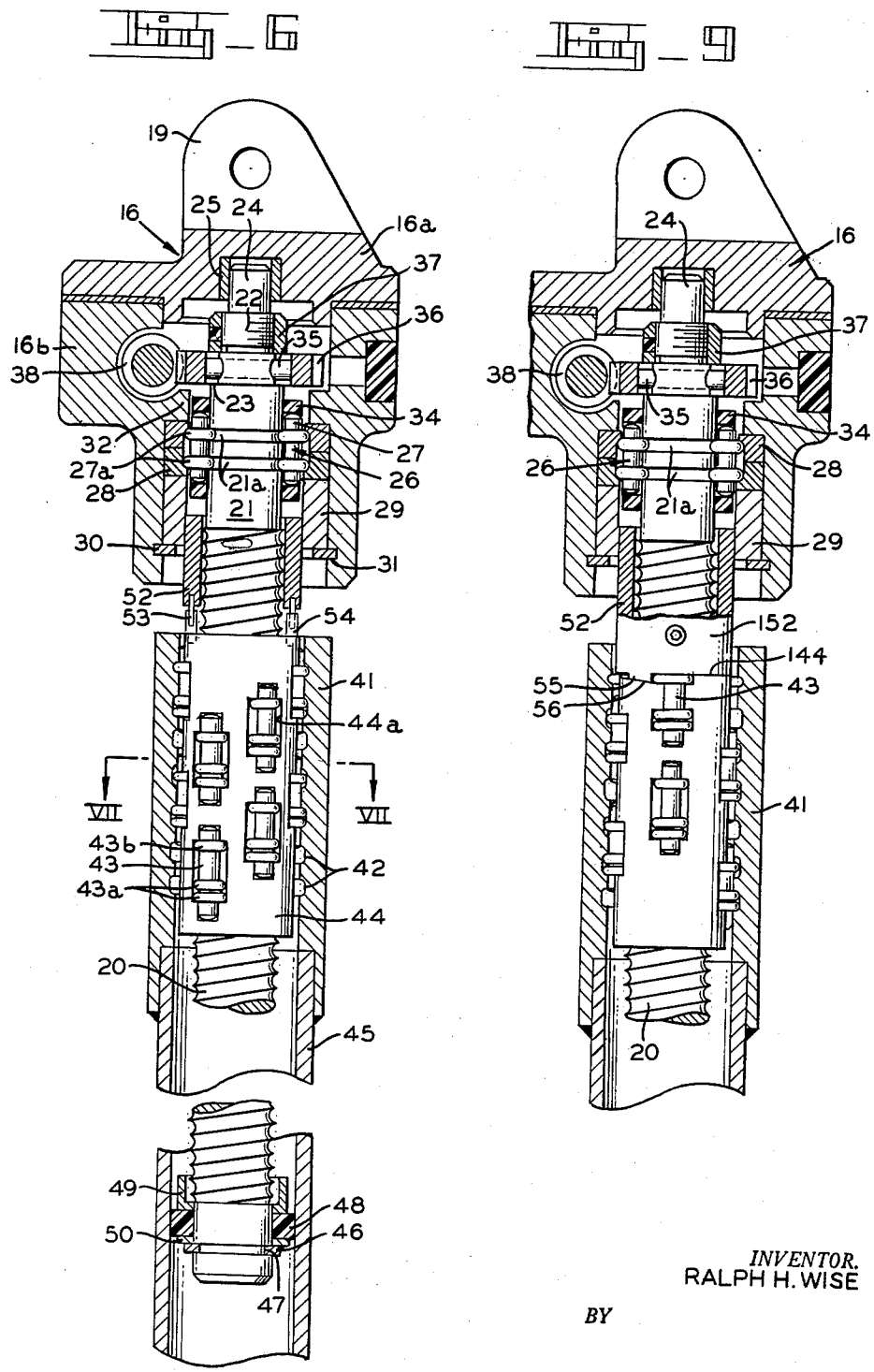

United States Patent Office 3,077,275
Patented Feb. 12, 1963

3,077,275
LOAD-CARRYING ASSEMBLY
Ralph H. Wise, Davis Island, Tampa, Fla., assignor, by mesne assignments to The Anderson Company, a corporation of Indiana
Continuation of application Ser. No. 594,197, June 27, 1956. This application July 18, 1957, Ser. No. 672,652
9 Claims. (Cl. 214—75)

The present invention relates to a power-operated assembly for load-carrying equipment and, more particularly, to a self-equalizing or self-levelizing dual element power-operated assembly.

This application is a continuation of my application, Serial No. 594,197, filed June 27, 1956, now abandoned.

Power-operated assemblies of the general type referred to have been proposed in the past for use in raising, lowering or otherwise operating endgates of trucks, landing gears of aircraft, convertible tops of automobiles and the like. Because of the very substantial forces required in moving a commercial load to and from, for instance, the ground and a compartment or bed of a truck, it has been usual, in the past, to actuate the power-operated equipment directly from the engine of the vehicle. For example, hydraulic systems may be pressurized from the running of a vehicle or aircraft engine until sufficient force is generated to operate hydraulic jacks and the like which will move the load. It has also been suggested to actuate the power means for moving the various loads through gears, pinions, and the like directly from a drive shaft rotated by the engine.

In any case, the provision of a power-operated assembly for a vehicle, aircraft, or the like has heretofore involved a substantial financial investment requiring operating mechanism of many and often complex parts. Additionally, aside from economic factors, the generation of a substantial force required to move heavy loads has seriously limited the minimum size of a vehicle, aircraft or the like which can feasibly be equipped with an engine-powered and operated assembly. As a result, relatively small vehicles for hauling half-ton loads or less have had to forego the advantages of such an assembly and rely on manual means for moving a designated load.

It has been suggested in the past that threaded shafts mounted in spaced relationship be used on opposite sides of a vehicle or the like to raise and lower a load as illustrated, for instance, in Patent No. 1,826,513 to Fosdick. The shafts are rotated in unison, and nut members travel along the shafts to move the load-carrying means relative to the ground. It has been during the operation of such mechanism, however, that unless a relatively expensive positive interlocking drive between the two threaded shafts is provided, that for various reasons the nut members in apparatus of this type tend in time to become spaced unequally from the ends of their respective shafts. This problem may become particularly acute where one nut member, in moving from an inward position to an outward position along the shaft, travels a slightly farther distance than the other nut member because of a failure to interlock the drive means for the shafts, and this difference may become cumulative during repeated cycles of operation. The nut members may become spaced so far apart relatively to each other along their respective shafts, that inefficient operation and even binding of the nut members may result.

The present assembly obviates the foregoing faults while eliminating the necessity for a positive interlock of the plurality of threaded drive shafts. Instead of relying on the engine of the vehicle for motivation, the present assembly may be electrically powered through a small high-speed motor coupled to the threaded shaft through a unique force-augmenting apparatus such that the electrical potential of a standard battery is ample to actuate the load-lifting mechanism. In this manner, for example, even the smallest delivery truck, airplane, convertible or the like can be equipped with a power-actuated endgate, landing gear, top or the like, respectively. Additionally, although a plurality of threaded members or shafts are used with their respective cooperating nut means in the present invention, there is no opportunity for the individual nut means to become permanently offset with respect to each other and interfere with or block the operation of an otherwise smooth-running assembly.

I have been able to use relatively high-speed, small-sized electrical means to actuate my assembly, as contrasted with the more complex and bulky hydraulic systems and gear trains of prior assemblies, by interposing force magnifying or augmenting means between the drive to a threaded member and the nut means which travels along the member. Thus, the threaded member or shaft may be rotated by a relatively small high-speed driving force as compared to those heretofore employed and yet transmit an ultimate force to the nut means or member sufficient to move a relatively heavy load.

Additionally, in the present apparatus the augmenting means and nut member are so constructed as to permit a threaded shaft to rotate freely within the member without causing relative axial travel therebetween when the nut member reaches an inward or "home" position. Accordingly, in those instances when one nut member may arrive at the inward position an instant or two sooner than a companion nut member on another shaft, the former continues to rotate relatively to its supporting shaft and without axial movement therebetween, thereby allowing the second nut member to reach the inward position on its respective shaft. In this manner, the nut members of the present invention always align themselves at the end of each cycle relatively to each other and at the start of each cycle their motion is begun from the same initial positions on their engaging shafts. With such a control of the nut position, it is apparent that they never become unduly offset in a manner such as has been previously described to interfere with the load-carrying operations.

In the illustrated form of the invention, the threaded shaft and nut means cooperate to pivot levers which are journaled along the opposite sides of a vehicle. Suitable links support a tailgate adjacent the free ends of the levers and coact to hold the endgate in a substantially horizontal position to which it has been moved from a nomally vertical position as an end of the compartment or bed of the truck.

The accompanying drawings illustrate one embodiment and a modification wherein:

FIGURE 1 is a side view of a truck embodying the present endgate assembly;

FIGURE 2 is a section of FIGURE 1 on the line II—II;

FIGURE 3 is an enlarged side view of the rearward end of the truck of FIGURE 1 in which the rear fender is broken away to show by solid and dotted lines various positions which the endgate assembly may take;

FIGURE 4 is a section of FIGURE 3 on the line IV—IV and illustrates one of the levers used to raise and lower the endgate;

FIGURE 5 is a section of FIGURE 3 on the plane of the line V—V and shows a link construction used to prevent movement of the endgate along the link after the endgate has moved a predetermined distance from a normal vertical position at the end of the truck;

FIGURE 6 is a section of FIGURE 2 on the line VI—VI and illustrates a threaded shaft, nut means, and thrust-transmitting elements which are used to pivot the lever of FIGURE 4;

FIGURE 7 is a section of FIGURE 6 on the line VII—VII;

FIGURE 8 is an enlarged, developed view of the nut means or member and the thrust-transmitting elements of FIGURE 7; and FIGURE 9 is a section similar to FIGURE 6 and illustrates a modified form for permitting freewheeling or relative rotation between the threaded shaft and nut means without relative axial travel.

*Structure*

For convenience of illustration as above stated, the present invention is disclosed in connection with a vehicle truck, although it may be adapted to actuate any gate assembly as well as other devices such as aircraft landing gears, convertible tops or the like. The embodiment illustrated includes a truck T having actuator means M to raise and lower an endgate G relative to the truck.

More particularly, the truck comprises a load-bearing compartment or bed 10 and levers 11 and 12 pivotally journaled as at 13 to opposite sides of the truck body or frame. Each lever is bowed upwardly as at 11a to clear the rear axle and outwardly offset at 11b (FIGURE 4) to form a length 11c terminating in a clevis 14. The rear fenders have slots 15 to accommodate pivotal movement of the levers 11 and 12.

The actuator means M includes telescoping apparatus mounted at each side of and at the rearward end of the truck bed 10. Each telescoping apparatus includes a housing generally indicated at 16 and formed by a cap 16a suitably bolted to a tubular member 16b (FIGURE 6). A bracket 17 mounted along the sides of the truck bed 10 carries each housing 16 for pivoting about a transverse axis by a pin 18 which passes through twin ears 19 on the cap 16a. Each housing supports an upper end of a helically threaded shaft 20 (FIGURE 6) for rotation about a longitudinal axis. The upper end of the shaft includes an unthreaded section 21 having spaced circumferential grooves 21a, a section 22 of reduced diameter to form a radial shoulder 23 and a tip 24 which seats within a bearing 25. A thrust bearing generally shown at 26 journals the shaft 20 for rotation about a longitudinal axis within the housing 16. This thrust bearing is shown and claimed in a copending application, Serial No. 512,464, now Patent No. 2,914,366, filed in the name of John W. Anderson. The thrust bearing 26 includes rotatable elements 27 having radially enlarged surface portions 27a which engage the grooves 21a and an outer race 28 which may be radially split to facilitate assembly of the parts. A spacer 29 and a snap ring 30 which fits in a slot 31 in the tubular member 16b hold the race 28 in place against an annular abutment 32 formed integrally with the tubular member 16b. A tubular cage 34 has openings to receive the rotatable elements 26 and space them peripherally about the shaft section 21. A pin 35 secures a drive gear 36 to section 22 of the shaft and against the shoulder 23. A nut 37 threaded on section 22 and preferably fixed thereto also abuts against the drive gear 36 to maintain it in place. A worm gear 38, suitably journaled at its opposite ends in the housing 16, extends across the housing substantially at right angles to the threaded shaft 20 and meshes with the drive gear 36. An electric motor 39 (FIGURE 2) carried beneath the compartment 10 of the truck has oppositely extending flexible cables 40, each of which is coupled to a drive shaft of the motor and to an end of a worm gear 38 in a housing 16.

Each shaft 20 carries a nut member which in the embodiment illustrated comprises a tube 41 having internal circumferential extending grooves 42. Augmenting means or means increasing the force transmitted in the form of rotatable bearing elements 43 are interposed between the shaft 20 and tube 41 to transmit and increase the force of the rotary movement of the shaft into translatory movement of the tube. This type of nut assembly is disclosed and claimed in my copending application, Serial No. 536,515, now Patent No. 2,966,069, which is hereby incorporated by reference. In particular, the elements 43 have radially enlarged bearing portions, two of which 43a are spaced so as to fit snugly within one of the grooves 42, and one of which 43b is spaced axially of the element 43 so as to enter freely another one of the grooves 42 (FIGURE 8). The closely spaced bearing surfaces 43a engage the sides of the grooves 42 to thrust the tube 41 in either axial direction and simultaneously engage both sides of a thread of the shaft 20. The bearing surface 43b also engages a thread of the shaft 20 to stabilize the mating of the shaft and rotatable elements and transmit radial thrust to the tube 41. The bearing surface 43b may, if desired, have some degree of axial movement within the groove 42 which it engages to prevent binding between the threads of shaft 20 and the grooves 42 of the tube 41. As shown in FIGURE 8, an end groove 42a may, if desired, be of a smaller width to receive snugly the relatively isolated bearing surface 43b of the end of bearing elements. Preferably, the radially enlarged contacting surfaces 43a and 43b are of toroidal curvature to form substantially a point-to-point or spot-to-spot contact. The illustrated structure uses twelve of the thrust-transmitting elements 43, but more or less may be employed depending on the total load to be transferred and the maximum allowable load per transfer point.

A cage or carrier 44 is also interposed between the shaft 20 and tube 41 and has openings 44a of general cruciform shape to house and space the elements 43 peripherally about the shaft 20. The elements 43 are free to rotate about their longitudinal axes within the openings 44a for planetation about the shaft 20 as hereinafter described. Each tube 41 is fixed to and coaxial with a sleeve 45 which cooperates with the tube 41, elements 43, and housing 16 to define the telescoping apparatus. At the lower end of each shaft 20, a retainer ring 46 seated in a groove 47 of the shaft maintains a centering washer 48, disposed between a stop 49 and a washer 50 against the threaded portion of shaft 20. Washer 48 rubs against the sleeve 45 during relative rotational and longitudinal movement between the shaft 20 and sleeve 45 and to this end may be composed of a synthetic plastic such as nylon. Stop 49 engages the cage 44 to limit outward movement of the tube 41 and sleeve 45 along the shaft 20. More specifically, when stop 49 is contacted by the end of cage 44, this cage is constrained to rotate with stop 49 and screw 20 thereby carrying elements 43 around therein. Grooves 42 extend around the inner periphery of tube 41 and receive therein bearing surfaces 43a. It can be seen that with a normal running contact between surfaces 43a and grooves 42 that there will be slippage between these contacting parts with the result that further rotation of the screw in the same direction will not further advance tube 41 on sleeve 45. This feature is termed "freewheeling." The lower end of each sleeve 45 is fixed to a medial portion of a bracket 51 having downturned ends 51a pivotally connected to the offset lengths of the levers such as length 11c of lever 11. An upturned end 51b serves a purpose hereinafter noted.

As shown in FIGURE 6, the tube 41 and rotatable elements 43 are in the "home" or inward position of their joint travel along the shaft 20. It is at this position that freewheeling or relative rotation between the shaft 20 and tube 41 in the absence of relative axial travel therebetween is desired, while a nut member of companion telescoping apparatus is still moving axially along its shaft, and thereby prevent accumulative offseting of the nut members relatively to each other. In the embodiment of FIGURE 6, a collar 52 is fixed relatively to the shaft 20 and has pins 53 projecting toward the cage 44. The latter has pins 54 projecting toward the collar 52 and engageable with the sides of the pins 53.

A modification of the structure is shown in FIGURE 9 where a collar 152 has a detent 55. The end 144 of a cage nearer the collar 152 is recessed as at 56 to expose at least partially one or more of the rotatable elements 43. The detent 55 and exposed element are thus engageable as shown. This structure is more fully disclosed and claimed in my copending application, Serial No. 562,805, which is hereby incorporated by reference. The embodiment of FIGURE 9 is otherwise similar to that of FIGURE 6.

A linkage system is used to maintain the endgate G in a substantially horizontal position as the levers 11 and 12 pivot about the pivot 13 on the truck T. In particular, the endgate G includes a plate or platform 57 having end flanges 58, each of which is provided with a pivot pin 59. A link 60 is pivotally connected to the clevis 14 of each lever and has a finger portion 60a extending past the clevis to engage an underside of the lever and limit clockwise pivoting of link 60 as viewed in FIGURE 3. The other end of the link 60 is pivotally connected to one of the adjacent flanges 58 of the plate. A second link 61 is pivotally connected to flange or link 51b of each of the brackets 51, and a third link 62 is pivoted at one end to link 61 and at the other end to the adjoining flange 58 and about the pivot pin 59 thereof. Each link 61 has a stop plate 63 which strikes the upper edge of link 62 to limit its counterclockwise movement as viewed in FIGURE 3. Each link 61 also carries a laterally flared strip 64 having a journaling recess 64a for the pivot pin 59.

FIGURE 5, as amended, shows flange 58 in a vertical position having link 62 attached thereto by means of a pin 59 for permitting free relative pivotal movement. A stop plate 63, attached to link 61, prevents movement of link 62 upward or counterclockwise as viewed in FIGURE 3. Numeral 64 represents a flared portion of member 61a connected to link 61 by rivets or spot welding which can be resiliently urged outwardly over pin 59 and adapted to receive pin 59 in notch 64a on the edge thereof. The endgate is, therefore, by reason of the cooperation of the links 60, 61, 62; notch 64a, and finger portion 60a retained in horizontal position regardless of the angular position of lever 11. However, each strip 64 is manually movable from around pin 59 and the whole endgate may then be manually pivoted from a horizontal to a vertical position.

*Operation*

The plate 57 of the endgate is normally in a closed or vertical position as shown by the dotted lines generally indicated by P₁ in FIGURE 3. When it is desired to operate the endgate assembly, the plate 57 is manually pivoted on the described linkage system until the full-line position of FIGURE 3 is reached whereupon the plate 57 is substantially level with the floor of the bed 10. During this movement, each strip 64 slides easily over the pivot pin 59 because of its outwardly flared disposition, until the recess 64a snaps into place around the bottom of a pivot pin 59. Thereafter, the pivot pin 59 and endgate are locked against moving longitudinally of the link 61.

A conventional two-way switch S energizes the motor 39 to rotate the shaft 20 of each telescoping apparatus through a flexible cable 40 and worm gear 38. As the shaft 20 turns, the thrust-transmitting elements 43 rotate on their own axes in rolling engagement with the thread of the shaft 20 to planetate about the shaft and at a rate slower than the rate by which the shaft 20 turns. This provides a mechanical advantage such that bearing surfaces of the elements 43 abut against the sides of the grooves 42 with a force greater than that which rotates the shaft 20. The tube 41 and sleeve 45 move axially of the shaft and lower the endgate until the position shown by the dotted lines generally indicated by P₂ in FIGURE 3 is reached. This position may be determined by striking the ground R or by the stop 49 on the shaft 20 (FIGURE 6). If desired, the thread of the shaft 20 may have a relatively low helical angle to provide a further mechanical advantage. The long arms 11, 12 and the upstanding link 51 attached to the tubular nut structure 45 form two (2) sides of a linkage which will maintain platform plate 57 level during its travel. The linkage is locked into its parallelogram form by the member 64 snapping over the pivot pin 59. The link part 60 thus remains as an extension of the arm 11 and the foldable link 61 will also remain straight. The side of the parallelogram opposite link 51 is formed by the upstanding flange 58 of the plate. The linkage is so chosen as to maintain the plate 57 in a substantially horizontal position.

The action of the parts of the assembly during the return movement of the endgate G to the full-line position of FIGURE 3 is similar but reversed, the two-way switch S being tripped to drive the motor 39 in the other direction. The cage members 44 and 144 (FIGURES 6 and 9) spiral toward the pins 53 or detent 55 until contact is made with the pins 54 or exposed element 43, respectively. At this time further axial travel of a tube 41 toward the housing 16 is prevented. However, since the bearing surfaces 43a and 43b are still free to roll and/or slide within the grooves 42 and 42a and about their longitudinal axes, the shaft 20 is also free to rotate relatively to the tube 41, only the cage 44 or 144 being now fixed relatively to the shaft 20. In this manner, the tube 41 of each telescoping apparatus is forced into its "home" position. The tubes 41 of companion telescoping apparatus align themselves with one another and level the plate 57 of the endgate relatively to the bed 10 of the truck regardless of nonuniformity of the helical threads of each shaft 20, unevenness of wear along the shafts, and the like.

At the full-line position of FIGURE 3 each of the flared strips 64 may be pried outwardly to permit a pivot pin 59 to slide past the journaling recess 64a and allow the endgate to be moved to its closed or normally vertical position. At this time, the links return to their original positions as shown by the dotted lines at position P₁.

By mounting the actuator assembly on an aircraft landing gear wherein one wheel would be connected at the end portion of each shaft 20, it can be readily seen that the wheels may be lowered or retracted together as desired. In like manner when the present two telescoping screw members are used to raise and lower a convertible top, it is almost impossible to jam the actuating mechanism since the automatic equalizing of the length of extension of the respective members during each operating cycle eliminates the development of pressures on the linkage mechanism.

Even though electrically powered from only a vehicle battery, the present apparatus is capable of carrying substantial loads. In one specific instance, using a six-volt battery and a motor having a power input of 190 ounce-inches, the apparatus produced over 2,000 pounds direct thrust.

It has been found in practice that the combination of the supporting arms, threaded shafts, and nut structures tends to maintain the ends of the shafts in a substantially equally extended condition relative to each other even though raised and lowered repeatedly. It is believed that the structure alone has a tendency to remain in alignment and to resist a tendency to get out of alignment as is prevalent in other commercial structures. In any event, true alignment of the nut means relative to the ends of the shafts is achieved at the end of each raising and lowering cycle. Each of the threaded shafts is allowed to freewheel relative to its nut structure so that each nut starts at a predetermined position in each raising and lowering cycle. This level relationship is maintained even though the load placed on the respective shafts is extremely unbalanced or unevenly distributed.

Although the foregoing disclosure describes one embodiment and a modification thereof, it is understood that the invention may be practiced in still other forms within the scope of the following claims.

I claim:

1. A gate assembly for a container including levers pivoted to the container and substantially paralleling the sides thereof, a gate secured to the free ends of the levers, actuating means to pivot said levers and thereby raise and lower the gate relative to the container including a threaded member for each lever journaled for rotation relative to the container, a nut member on each threaded member for axial travel therealong between inward and outward positions, a sleeve telescopically receiving a portion of each threaded member, each of said sleeves being fixed relative to the nut members and secured to one of the levers so that axial travel of each of the nut members along the threaded members pivots the lever secured thereto, and means to permit rotation of said nut members relative to said threaded members without relative axial travel therebetween when the nut members are at the inward position.

2. An endgate assembly for a vehicle including levers pivoted adjacent one end to opposite sides of the vehicle, an endgate pivotally secured to the free ends of the levers, actuating means to pivot the levers and thereby raise and lower the endgate relative to the vehicle, said actuating means including threaded shafts mounted for rotation relative to a rearward end of the vehicle, a nut member encompassing each threaded shaft for axial travel therealong toward and away from a station adjacent the journaling of each shaft to thereby transmit the rotary force of the shaft as translatory force of the nut member, means to augment the force transmitted from each shaft to each nut member, a sleeve telescopically receiving a portion of each of said shafts, each of said sleeves being fixed relative to the respective nut members and connected to one of the levers whereby axial travel of the nut members along the shafts pivots the levers, electrical means cooperating with said augmenting means to rotate the shafts and transmit a substantial thrust force to said sleeves, and freewheeling means to permit rotation of the nut members relative to the shafts without relative axial travel therebetween when the nut members are traveling toward and reach said station adjacent the journaling of each shaft.

3. An endgate assembly as claimed in claim 2 wherein the endgate comprises a plate member having a flange provided with a pivot, and the means to pivotally secure the endgate to the free ends of the levers includes a link pivotally securing said flange to one of the levers, journaling means on said link operable upon pivoting the endgate on the levers and away from the vehicle to engage said pivot and hold said flange against movement relative to said link.

4. An endgate assembly as claimed in claim 2 wherein the endgate comprises a plate having end flanges, one of which is provided with a protruding pivot pin, and means to pivotally secure the endgate to the free ends of the levers including a first link pivotally joining each lever to an adjacent flange of the plate, a second link pivotally joining each lever to an adjacent flange of the plate but spaced from the first link, a strip having a portion with a journaling recess flaring laterally from one of said links, said lateral flare of said portion engaging with said protruding pivot pin and being deflected outwardly as said plate is moved away from said vehicle, said strip snapping into locking position with said pivot pin nested in said recess, the links forming a parallelogram structure to maintain the plate of the endgate in a substantially horizontal position as the levers pivot about the vehicle.

5. An endgate assembly as claimed in claim 2 wherein the vehicle has a load-bearing compartment and the endgate comprises a plate normally disposed in a substantially vertical position to close an end of said compartment, said plate having end flanges directed inwardly of said compartment and provided with pivot pins, a pair of levers each pivoted at one end to the vehicle, and means to pivotally secure the endgate to each of said levers comprising a first link pivoted to the free end of one of said levers and to an adjacent flange of the plate, a second link operatively pivoted near the free end of said last-named lever and spaced forwardly of the first link when the endgate is in said normally vertical position, a third link pivoted to said second link and to an adjacent flange of the plate for pivotal movement around said pivot pin therof, a strip carried by said second link having a journalling recess and being flared laterally from said link, said flared portion of the strip being adapted to engage with and slide past said associated pivot pin as the plate moves from its normal vertical position toward a horizontal position to snap-engage said recess with said associated pivot pin and prevent the pivot pin from thereafter moving longitudinally of the link carrying said strip, the links forming a substantially parallelogram structure to maintain the plate of the endgate in a substantially horizontal position as the levers pivot about the vehicle, and means on one of said first links to engage its associated lever to limit relative movement about their pivotal connection.

6. A material handling and lifting unit for a vehicle comprising; a platform member mounted on the vehicle for raising and lowering movement between a vehicle floor level and a different level, a pair of spaced threaded shafts rotatably mounted on the vehicle and carrying nut members reciprocably thereon and attached to the platform for moving the same, electrical motor means common to both shafts for rotating the threaded shafts at the same time when energized by the vehicle electrical system, and a linkage connecting the plattform member to the nut members for maintaining the same generally level during its raising and lowering movements and each shaft is provided with freewheeling means permitting turning of the shaft when the nuts are stopped at the end of their travel to insure aligning of the nuts across the vehicle at the end of each raising and lowering movement.

7. An endgate for the bed of a motor vehicle comprising; an endgate, a pair of substantially parallel levers pivotally connected to the vehicle forward of the endgate and extending aft toward the endgate, an upright bracket pivoted to one lever at a point spaced from the aft end, power means for moving the upright bracket along a substantially vertical path for raising and lowering the aft end of the lever, a first link pivotally connected between the aft end of the lever and the endgate, a second collapsible link connected between the vertically moving upright bracket and the endgate at a point on the endgate spaced apart from the first connection thereto whereby the endgate is maintained in horizontal position regardless of the relative angular position of the lever, said second link adapted to be collapsed whereby the endgate may be manually pivoted to a vertical position adjacent the motor vehicle bed.

8. A combination lifting platform and endgate for the open end of the bed of a motor vehicle comprising in combination: an endgate including a platform portion, a pair of substantially parallel elongate levers adapted to be pivotally mounted on the motor vehicle forward of the open end and extending aft for supporting the endgate at different elevations, power means having a linear output operative in a generally vertical direction and operatively connected to the levers to pivot said levers about their pivotal mounting on the vehicle to raise and lower the aft end of said levers substantially from ground elevation to bed elevation, linkage means connecting the endgate to the aft end of the levers for supporting the platform portion of the endgate in a generally horizontal position as the levers are raised through different elevations, one of the links of said linkage means being collapsible so as to permit the platform to be moved to a vertically disposed position adjacent the open end of the bed of the motor vehicle.

9. A combination lifting platform and endgate for the open end of the bed of a motor vehicle comprising in combination: an endgate including a platform portion, a pair of substantially parallel elongate levers adapted to be pivotally mounted on the motor vehicle forward of the open end and extending aft for supporting the endgate at different elevations, power means having a linear output adapted to be connected to the levers to raise and lower the aft end of the levers to different elevations, bracket means pivotally connected to respective levers, said bracket means also being connected to the power means for generally vertical linear movement to raise the aft end of the levers, parallel linkage means connecting the endgate to the levers comprising first link means pivotally connected between the aft end of each lever and said endgate, and second link means pivotally connected between the vertically moving bracket and the endgate at a point on the endgate spaced from the first connection thereto whereby the platform portion of the endgate is maintained in horizontal position regardless of relative angular position of the levers, said second link being collapsible to permit the endgate to be pivoted from a horizontal to a vertical position adjacent the open end of the bed of the motor vehicle.

References Cited in the file of this patent

UNITED STATES PATENTS

| | | |
|---|---|---|
| 2,616,302 | Wahlmark | Nov. 4, 1952 |
| 2,639,625 | Geyer et al. | May 26, 1953 |
| 2,682,780 | Pickles | July 6, 1954 |
| 2,683,540 | Wood | July 13, 1954 |
| 2,698,103 | Rostine | Dec. 28, 1954 |
| 2,734,392 | Falk | Feb. 14, 1956 |
| 2,768,532 | Russell | Oct. 30, 1956 |
| 2,779,488 | Trotter et al. | Jan. 29, 1957 |
| 2,822,938 | Ormsby | Feb. 11, 1958 |
| 2,966,069 | Wise | Dec. 27, 1960 |